US012254822B2

(12) United States Patent
Yin et al.

(10) Patent No.: US 12,254,822 B2
(45) Date of Patent: Mar. 18, 2025

(54) DISPLAY DEVICE CAPABLE OF IN-DISPLAY SENSING

(71) Applicant: Guangzhou Tyrafos Semiconductor Technologies Co., Ltd., Guangzhou (CN)

(72) Inventors: Ping-Hung Yin, Hsinchu (TW); Jia-Shyang Wang, Miaoli County (TW); Dean Wang, Taichung (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 0 days.

(21) Appl. No.: 18/497,010

(22) Filed: Oct. 30, 2023

(65) Prior Publication Data

US 2024/0153457 A1 May 9, 2024

Related U.S. Application Data

(60) Provisional application No. 63/422,456, filed on Nov. 4, 2022.

(51) Int. Cl.
*G09G 3/32* (2016.01)
*G09G 3/3208* (2016.01)
(Continued)

(52) U.S. Cl.
CPC ............ *G09G 3/32* (2013.01); *G09G 3/3208* (2013.01); *G09G 3/3233* (2013.01); *G09G 3/3275* (2013.01); *G09G 2300/0819* (2013.01); *G09G 2300/0842* (2013.01); *G09G 2300/0852* (2013.01); *G09G 2300/0861* (2013.01); *G09G 2310/0208* (2013.01); *G09G 2310/0251* (2013.01); *G09G 2310/0291* (2013.01);
(Continued)

(58) Field of Classification Search
CPC ...... G09G 3/32; G09G 3/3208; G09G 3/3233; G09G 3/3275; G09G 2300/0819; G09G 2300/0842; G09G 2300/0852; G09G 2300/0861; G09G 2300/0208; G09G 2300/0251; G09G 2300/0291; G09G 2310/0251; G09G 2310/0291; G09G 2310/067; G09G 2310/08; G09G 2320/045; G09G 2360/14; G09G 2360/148
See application file for complete search history.

(56) References Cited

U.S. PATENT DOCUMENTS 9,741,290 B1 * 8/2017 Lee ...................... G09G 3/3233
2021/0335234 A1 * 10/2021 Yin ...................... G09G 3/3291

* cited by examiner

*Primary Examiner* — Nitin Patel
*Assistant Examiner* — Cory A Almeida

(57) ABSTRACT

The present invention is related to a display device, including: a plurality of sub-pixel areas, each including a pixel circuit, each pixel circuit including: a diode, configured to be in a forward-biasing state during a display phase of the pixel circuit for light-emitting and configured to be in a reverse-biasing state in a sensing phase of the pixel circuit for light-sensing; a driving transistor for driving the diode during the display phase and serving as a source follower in the sensing phase; first to sixth transistors, applied to the gates of the first to sixth transistors respectively so that the pixel circuit switching between the display phase and the sensing phase; and a capacitor for storing a data voltage to be written to the diode in the display phase and storing the charge accumulated by the diode in the sensing phase.

7 Claims, 13 Drawing Sheets

(51) Int. Cl.
*G09G 3/3233* (2016.01)
*G09G 3/3275* (2016.01)

(52) U.S. Cl.
CPC ... *G09G 2310/067* (2013.01); *G09G 2310/08* (2013.01); *G09G 2320/045* (2013.01); *G09G 2360/14* (2013.01); *G09G 2360/148* (2013.01)

DISPLAY DEVICE CAPABLE OF IN-DISPLAY SENSING

BACKGROUND OF THE INVENTION

1. Field of the Invention

The present invention relates generally to a display device, and more particularly, to a display device able to realize both display and sensing functions in the same pixel circuit to provide an in-screen sensing function.

2. The Prior Arts

In general, a display device often only has a display function. Some display devices provides both display and touch functions. However, when sensing is required, for example, when an optical fingerprint sensor (OFPS) is used for sensing, the optical fingerprint sensor will need to be implemented as an independent device. In addition, when the optical sensing module is bonded under the display device, there will be additional cost, additional thickness, and additional yield risk during bonding.

Moreover, since the sensing area depends on the area of the sensor, the sensing area will be much smaller than the area of the entire panel. In addition, since the optical sensing module is attached to the bottom of the display device, components between the sensed object and the sensor may block the light.

Therefore, it is necessary to provide a display device that can integrate the sensing function and the display function in the same pixel circuit to overcome the above problems.

SUMMARY OF THE INVENTION

In order to achieve the objective of effectively solving the above problems, the present invention provides a display device, including: a plurality of sub-pixel areas, each including a pixel circuit, each pixel circuit including: a diode, configured to a forward-biasing state in a display phase of the pixel circuit for light-emitting and configured to a reverse-biasing state in a sensing phase of the pixel circuit for light-sensing; a driving transistor, for driving the diode in the display phase and serving as a source follower in the sensing phase; first to sixth transistors, gates of the first to sixth transistors being respectively applied with first to sixth gate control signals, so that the pixel circuit switches between the display phase and the sensing phase; and a capacitor, for storing a data voltage to be written to the diode in the display phase and storing charges accumulated by the diode in the sensing phase; a first circuit, for applying the six gate control signals to each pixel circuit to switch each pixel circuit between the display phase and the sensing phase respectively; and a second circuit, for applying an initialization voltage, the data voltage, a driving voltage, and a common voltage, and the second circuit comprising a readout part for reading out the light sensed by the diode during the sensing phase of the pixel circuit. The second circuit may be, for example, one of a row circuit or a column circuit, but it is not limited thereto.

Preferably, in the display phase, the first gate control signal is the same as the second gate control signal, the third gate control signal is the same as the fourth gate control signal, and the fifth gate control signal is the same as the sixth gate control signal.

Preferably, in each pixel circuit, a first electrode of the first transistor is connected to a first node, a second electrode of the first transistor is applied with the initialization voltage, a first electrode of the second transistor is applied with the initialization voltage, a second electrode of the second transistor is connected to a second node, a first electrode of the third transistor is connected to the first node, a second electrode of the third transistor is connected to a third node, a first electrode of the fourth transistor is applied with the data voltage, a second electrode of the fourth transistor is connected to a fourth node, a first electrode of the fifth transistor is connected to the third node, a second electrode of the fifth transistor is connected to the second node, a first electrode of the sixth transistor is connected to the driving voltage, a second electrode of the sixth transistor is connected to the fourth node, a gate of the driving transistor is connected to the first node, a first electrode of the driving transistor is connected to the fourth node, a second electrode of the driving transistor is connected to the third node, a first electrode of the diode is connected to the second node, and a second electrode of the diode is applied with the common voltage.

Preferably, the sensing phase includes: a first sensing phase, for initializing the diode so that the diode is in the reverse-biasing state; a second sensing phase, for storing the charge accumulated in the diode into the capacitor; and a third sensing phase, for using the driving transistor as the source follower to read out the charge stored in the capacitor.

Preferably, in the first sensing phase, the first to sixth gate control signals control the first to sixth transistors respectively, so that the first transistor, the second transistor, the third transistor, and the fifth transistor are on, while the fourth transistor and the sixth transistor are off; in the second sensing phase, the first to sixth gate control signals controls the first to sixth transistors, so that the third transistor and the fifth transistor are on, and the first transistor, the second transistor, the fourth transistor, and the sixth transistor are off; and in the third sensing phase, the first to sixth gate control signals control the first to sixth transistors respectively, so that the second transistor, the fourth transistor, and the fifth transistor are on, and the first transistor, the third transistor, and the sixth transistor are off.

Preferably, the readout part comprises a plurality of readout circuits, so that a plurality of pixel circuits in each column have respective corresponding readout circuits, and each readout circuit comprises a current source for reading out the light sensed by the diodes in the pixel circuits in the sensing phase of the pixel circuits.

Preferably, in the third sensing phase, the charge stored in the capacitor is input to the gate of the driving transistor using the first node as an input voltage, and the light sensed by the diode as a photodiode is read out as an output voltage located at the readout circuit.

Preferably, the diode comprises one of a micro light-emitting diode (micro-LED), a sub-millimeter light-emitting diode (mini-LED), and an organic light-emitting diode (OLED).

Preferably, the driving transistor and the first to sixth transistors comprise one of or any combination of P-type metal oxide semiconductor field effect transistors (MOSFET), N-type MOSFETs, thin film transistors (TFT), low-temperature polycrystalline silicon TFTs, and low-temperature polycrystalline oxide TFTs.

The present invention will be apparent to those skilled in the art by reading the following detailed description of a preferred embodiment thereof, with reference to the attached drawings.

DETAILED DESCRIPTION OF THE PREFERRED EMBODIMENT

Figure 1A:
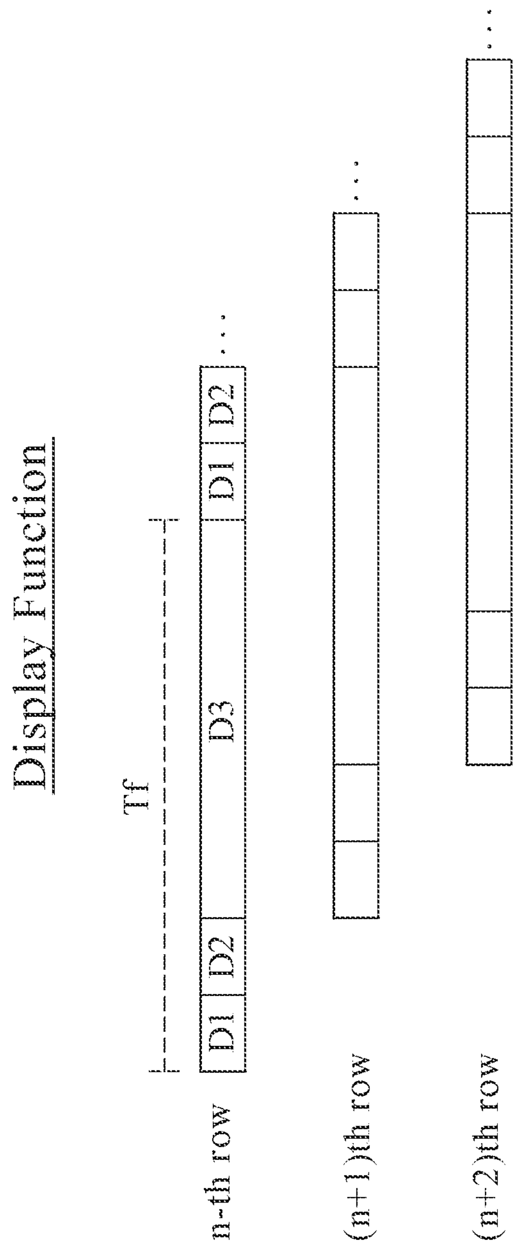
FIG. 1A is an operation timing diagram of a display device with only a display function.

The accompanying drawings are included to provide a further understanding of the invention, and are incorporated in and constitute a part of this specification. The drawings illustrate embodiments of the invention and, together with the description, serve to explain the principles of the invention.

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example embodiments.

It should be noted that the pixel circuit of the present invention can be implemented in any sub-pixel such as red sub-pixel, blue sub-pixel, green sub-pixel, white sub-pixel, etc., but the present invention is not limited thereto.

Refer to FIG. 1A. FIG. 1A is an operation timing diagram of a display device with only a display function. As shown in FIG. 1A, the display device with only a display function is displayed in a row-by-row manner, from the upper left corner to the lower right corner, and finally forms an image frame. One frame time Tf includes: the first display phase D1, which is used to initialize the circuit; the second display phase D2, for writing data; and a third display phase D3, which is used to emit light to display data. Since the display device only has a display function, one frame time Tf is equal to the sum of the first display phase D1 to the third display phase D3.

It should be understood that when the circuit is actually operating, there will be switching time between each phase. For ease of understanding, in this specification, the duration of each phase includes the actual execution of the corresponding action and switching to the next phase. For example, the second display phase D2 includes the time of writing data and switching to the third display phase D3.

Figure 1B:
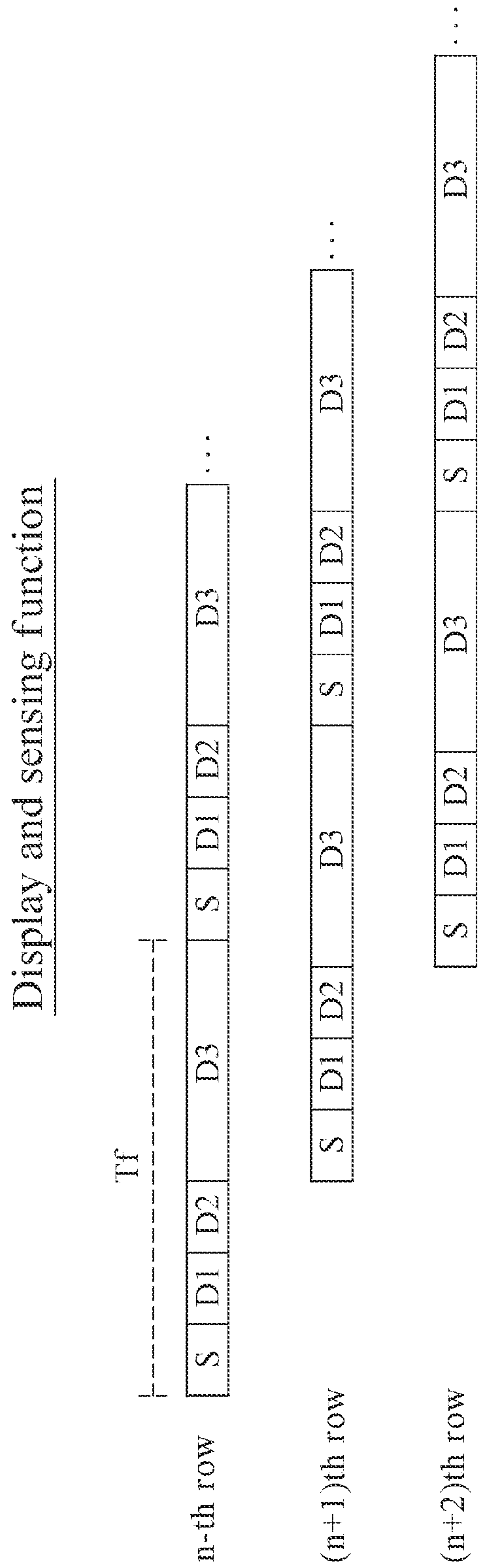
FIG. 1B is an operation timing diagram of the display device of the present invention.

Refer to FIG. 1B, which is an operation timing diagram of the display device of the present invention. Since the present invention integrates the sensing function and the display function into the same pixel circuit in the display device, the frame time Tf of the present invention further includes a sensing phase S for sensing data. Therefore, through the control of the gate control signal, the operation timing of the display device of the present invention is adjusted to include the sensing phase S and the display phase D, which includes the first display phase D1 to the third display phase D3.

It can be understood that, according to the user's settings, at the same point in time, the pixel circuits in the display device may be in different stages. For example, the pixel circuits in different rows may be in different stages. In addition, since the sensing phase S and the display phase D of the present invention are achieved by controlling the gate control signal GCS to adjust the operating sequence, the sensor of the display device can be turned on or off the sensing phase S at any time according to the user's settings and needs.

Figure 2:
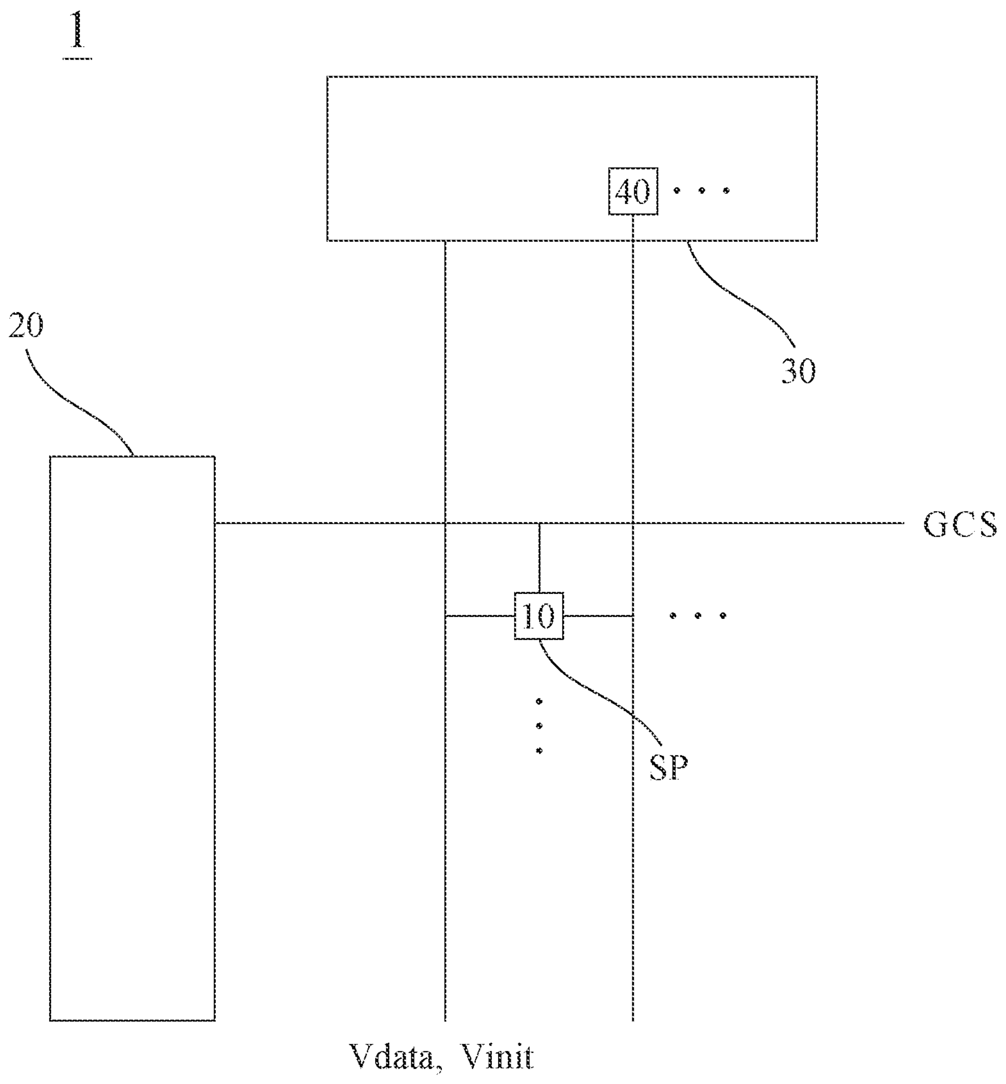
FIG. 2 is a structural diagram of a display device according to a first embodiment of the present invention.

Refer to FIG. 2, which is a structural diagram of a display device 1 according to the present invention.

As shown in FIG. 2, the display device 1 of the present invention includes: a plurality of sub-pixel areas SP, each including a pixel circuit 10; a first circuit 20, by applying a gate control signal GCS to each pixel circuit 10, so that each pixel circuit 10 can switch between the display phase D and the sensing phase S respectively. For example, the first circuit 20 can be a row circuit; and a second circuit 30, used to apply the initialization voltage Vinit and the voltage Vdata and including a readout part, and the readout part is read out the light sensed by the diode LED during the sensing phase S of the pixel circuit 10. The readout part comprises a plurality of readout circuits 40 so that the plurality of pixel circuits of each column has respective corresponding readout circuit, for reading out the light sensed by the diode LED during the sensing phase S of the pixel circuit 10.

Figure 3:
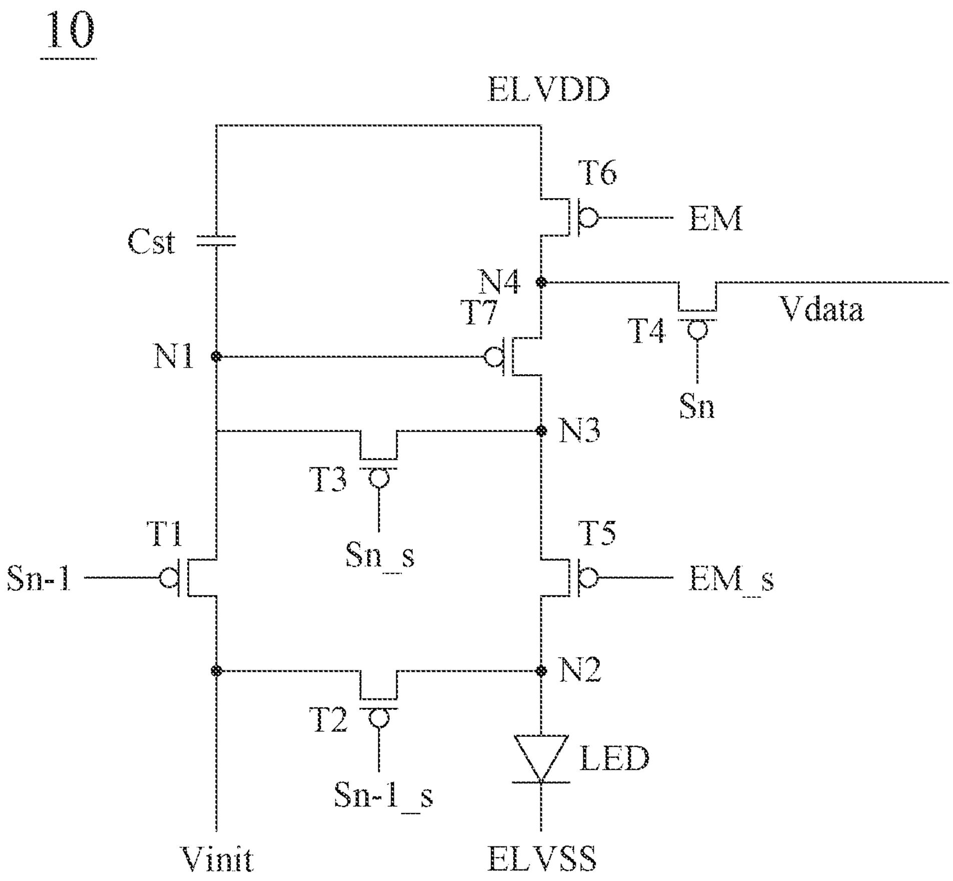
FIG. 3 is a circuit diagram of a pixel circuit according to the first embodiment of the present invention.
Figure 4:
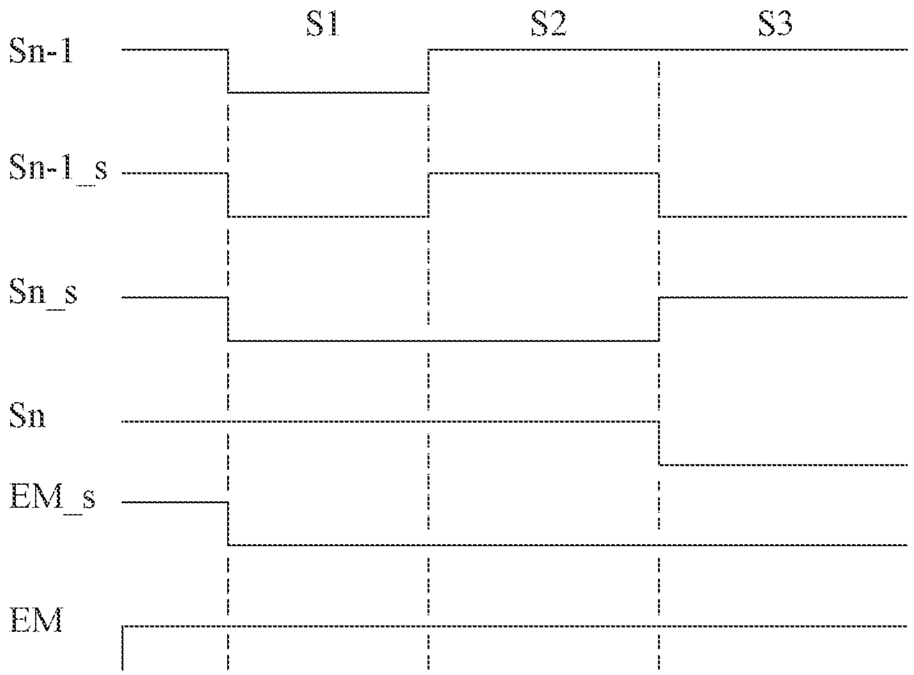
FIG. 4 is a timing operation diagram illustrating the sensing phase of the pixel circuit according to the first embodiment of the present invention.
Figure 5:
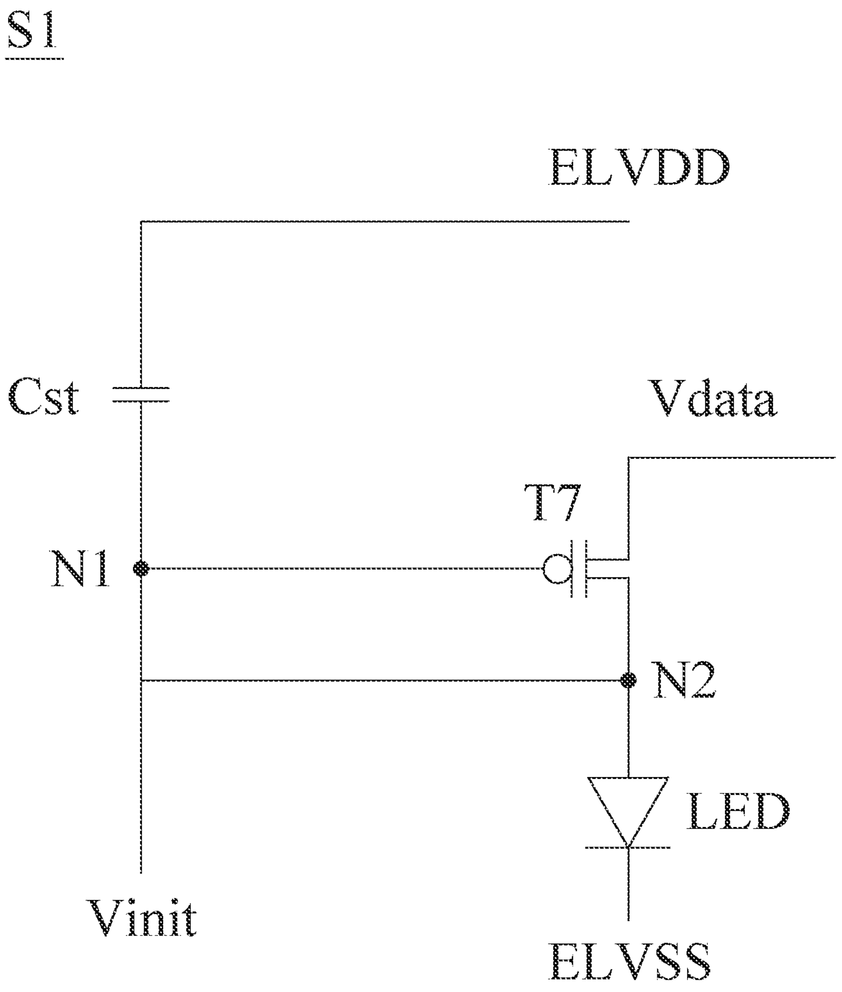
FIG. 5 is an equivalent circuit diagram of the first sensing phase of the pixel circuit according to the first embodiment of the present invention.
Figure 6:
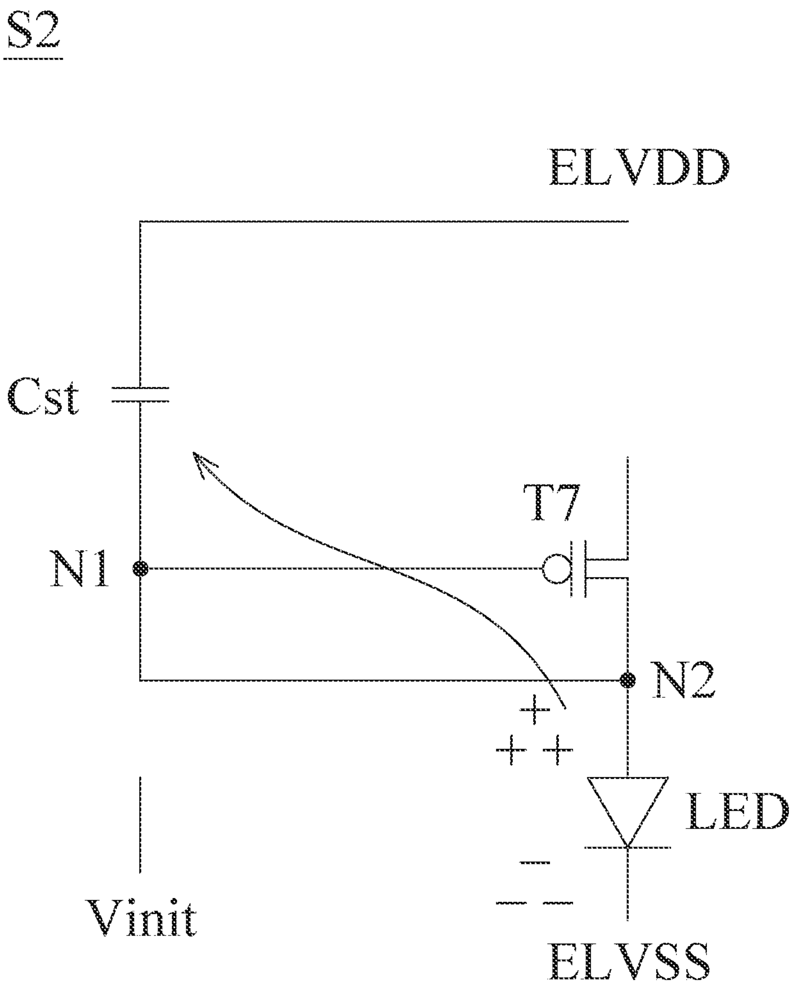
FIG. 6 is an equivalent circuit diagram of the second sensing phase of the pixel circuit according to the first embodiment of the present invention.
Figure 7:
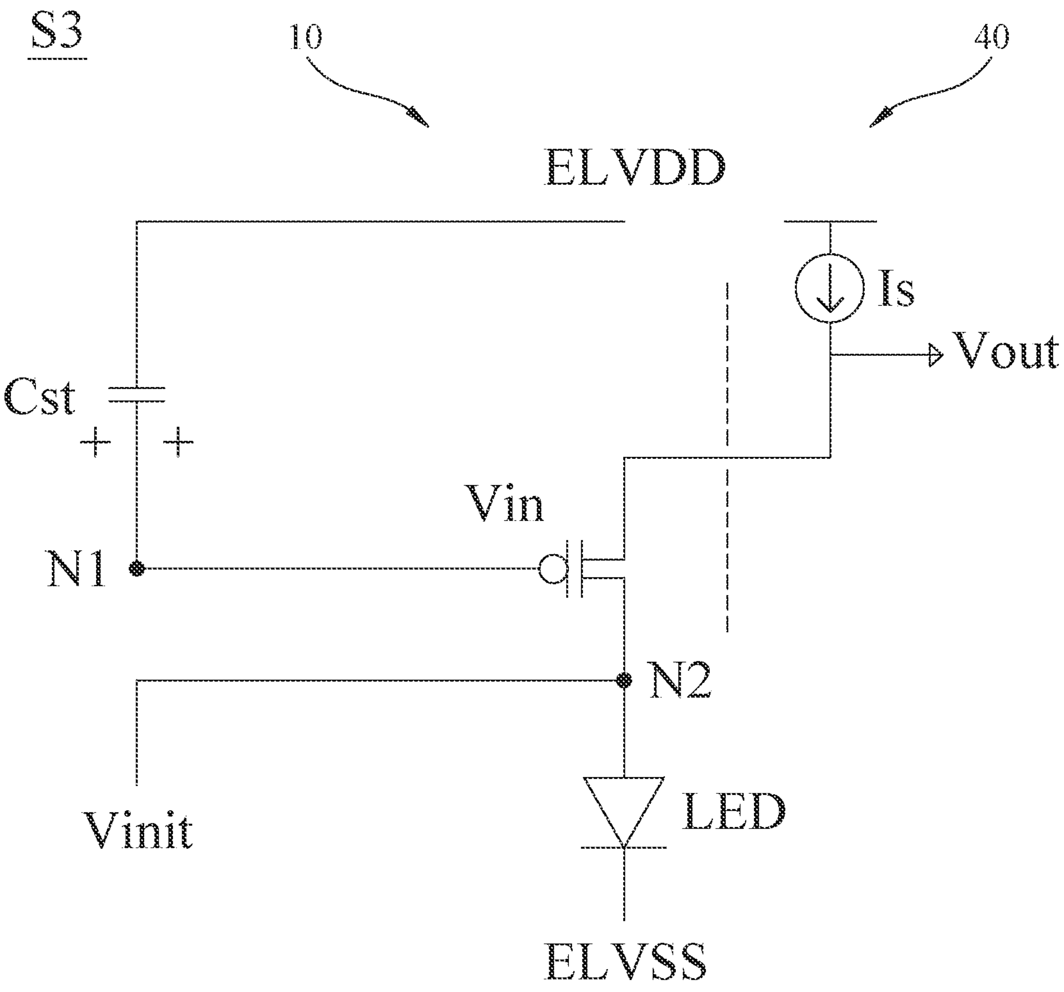
FIG. 7 is an equivalent circuit diagram of the third sensing phase of the pixel circuit according to the first embodiment of the present invention.

Refer to FIGS. 3-7. FIG. 3 is a circuit diagram of a pixel circuit 10 according to the first embodiment of the present invention; FIG. 4 is a timing operation diagram illustrating the sensing phase S of the pixel circuit 10 according to the first embodiment of the present invention; FIG. 5 is an equivalent circuit diagram of the first sensing phase S1 of the pixel circuit 10 according to the first embodiment of the present invention; FIG. 6 is an equivalent circuit diagram of the second sensing phase S2 of the pixel circuit 10 according to the first embodiment of the present invention; and FIG. 7 is an equivalent circuit diagram of the third sensing phase S3 of the pixel circuit according to the first embodiment of the present invention.

Refer to FIG. 3. The pixel circuit 10 of the present invention comprises: the first to sixth transistors T1 to T6; the driving transistor T7; the diode LED; and the capacitor Cst. The gate control signal GCS includes the first gate control signal Sn-1, the second gate control signal Sn-1_s, the third gate control signal Sn_s, the fourth gate control signal Sn, the fifth gate control signal EM_s, and the sixth gate control signal EM. The first transistor T1 is controlled by the first gate control signal Sn-1, the second transistor T2 is controlled by the second gate control signal Sn-1_s, the third transistor T3 is controlled by the third gate control signal Sn_s, the fourth transistor T4 is controlled by the fourth gate control signal Sn, the fifth transistor T5 is controlled by the fifth gate control signal EM_s, and the sixth transistor T6 is controlled by the sixth gate control signal EM. In addition, the data voltage Vdata, the initialization voltage Vinit, the driving voltage ELVDD, and the common voltage ELVSS are applied to the pixel circuit 10.

Refer to FIG. 3. In the pixel circuit 10, the first electrode of the first transistor T1 is connected to the first node N1, the second electrode of the first transistor T1 is applied with the initialization voltage Vinit, the first electrode of the second transistor T2 is applied with the initialization voltage Vinit, the second electrode of the second transistor T2 is connected to the second node N2, the first electrode of the third transistor T3 is connected to the first node N1, the second electrode of the third transistor T3 is connected to the third node N3, the first electrode of the fourth transistor T4 is applied with the data voltage Vdata, the second electrode of the fourth transistor T4 is connected to the fourth node N4, the first electrode of the fifth transistor T5 is connected to the third node N3, the second electrode of the fifth transistor T5 is connected to the second node N2, the first electrode of the sixth transistor T6 is connected to the driving voltage ELVDD, the second electrode of the sixth transistor T6 is connected to the fourth node N4, the gate of the driving transistor T7 is connected to the first node N1, the first electrode of the driving transistor T7 is connected to the fourth node N4, the second electrode of the driving transistor T7 is connected to the third node N3, the first electrode of the diode LED is connected to the second node N2, and the second electrode of the diode LED is applied with a common voltage ELVSS.

It should be noted that the display device of the present invention divides the pixel circuit 10 into a sensing phase S and a display phase D by applying the gate control signal GCS. In the sensing phase S, the diode LED is under reverse-biasing to sense light as a photodiode. Then, the diode LED accumulates charges to the first node N1 in an integral mode and stores the accumulated charges in the capacitor. Cst, and finally, the charge stored in the capacitor Cst is read out. In the display phase D, the diode LED is in forward-biasing to emit light as a light-emitting diode to display data according to the data voltage Vdata. It can be understood that the diode LED of the present invention includes, but is not limited to, micro-LEDs, sub-millimeter light-emitting diodes (mini-LEDs), and organic light-emitting diodes (OLEDs).

The circuit operation of the sensing phase S of the pixel circuit 10 according to the first embodiment of the present invention will be described below with reference to FIGS. 3-7.

Refer to FIG. 4. The sensing phase S of the present invention includes: a first sensing phase S1, used to initialize the diode LED, so that the diode LED is in reverse-biasing to sense light as a photodiode; a second sensing stage S2, wherein the diode LED begins to accumulate charges as a photodiode and the accumulated charges are stored in the capacitor Cst; and a third sensing stage S3, wherein the driving transistor T7 is used as a source follower to read out the charge stored in the capacitor Cst.

It should be understood that the embodiment of the present invention uses an N-type metal oxide semiconductor (NMOS) field effect transistor as an exemplary transistor in the pixel circuit 10. However, the present invention is not limited thereto. The transistor used in the pixel circuit of the present invention can be arbitrarily implemented as P-type PMOS field effect transistor, thin film transistor (TFT), low-temperature polycrystalline silicon (LTPS) TFT, low-temperature polycrystalline oxide (LTPO) TFT, etc. In addition, the transistors can also be combined arbitrarily to form the pixel circuit of the present invention. For example, some transistors are implemented as PMOS and other transistors are implemented as NMOS.

Specifically, referring to FIGS. 3-5, in the first sensing phase S1, under the control of the first gate control signal Sn-1, the second gate control signal Sn-1_s, the third gate control signal Sn_s, the fourth gate control signal Sn, the fifth gate control signal EM_s, and the sixth gate control signal EM, the first transistor T1, the second transistor T2, the third transistor T3, and the fifth transistor T5 are on, while the fourth transistor T4 and the sixth transistor T6 are off. Therefore, the diode LED can be reverse biased by the initialization voltage Vinit to sense light as a photodiode.

Specifically, referring to FIGS. 3, 4, and 6, in the second sensing phase S2, under the control of the first gate control signal Sn-1, the second gate control signal Sn-1_s, the third gate control signal Sn_s, the fourth gate control signal Sn, the fifth gate control signal EM_s, and the sixth gate control signal EM, the third transistor T3 and the fifth transistor T5 are on, while the first transistor T1, the second transistor T2, the fourth transistor T4, and the sixth transistor T6 are off. Therefore, the charge accumulated in the diode LED will be transferred to the first node N1 and stored in the capacitor Cst.

Specifically, referring to FIGS. 3, 4, and 7, in the third sensing phase S3, under the control of the first gate control signal Sn-1, the second gate control signal Sn-1_s, the third gate control signal Sn_s, the fourth gate control signal Sn, the fifth gate control signal EM_s, and the sixth gate control signal EM, the second transistor T2, the fourth transistor T4, and the fifth transistor T5 are on, while the first transistor T1, the third transistor T3, and the sixth transistor T6 are off. Therefore, in the third sensing phase S3, the driving transistor T7 is used as a source follower, the charge stored in the capacitor Cst during the second sensing phase is used as the input voltage Vin through the first node N1 to the gate of the driving transistor T7, and the light sensed by the diode LED as the photodiode is read out as the output voltage Vout of the readout circuit 40.

It can be understood that each readout circuit 40 may include a current source Is, for reading the output voltage Vout in the third sensing phase S3.

Figure 8:
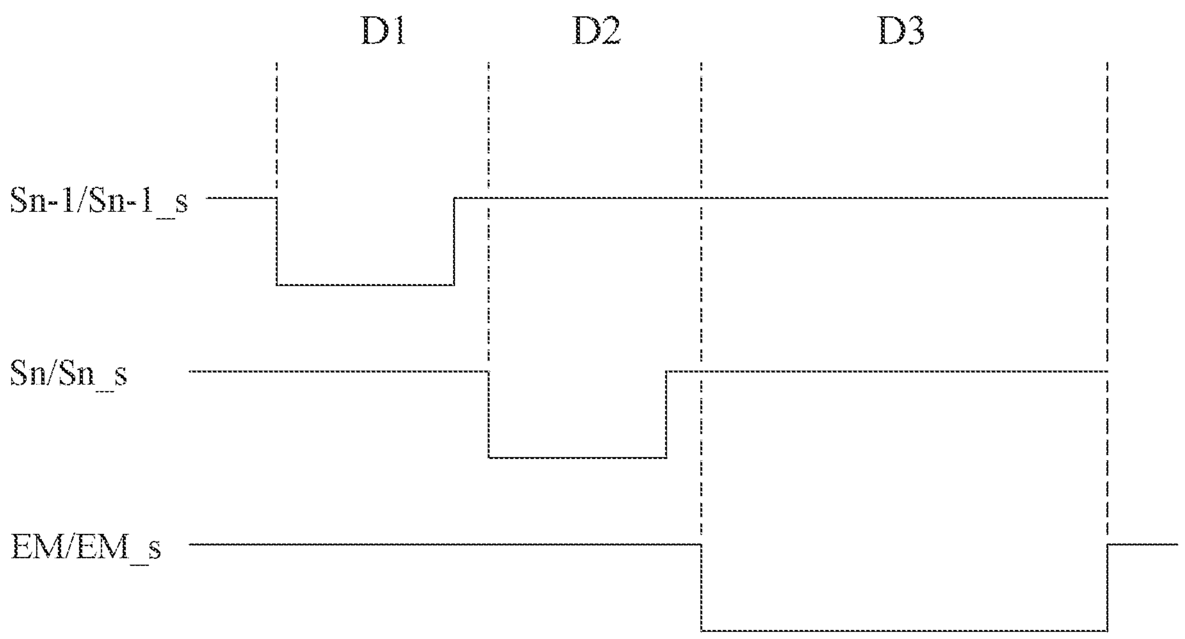
FIG. 8 is a timing operation diagram illustrating the display phase of the pixel circuit according to the first embodiment of the present invention.
Figure 9:
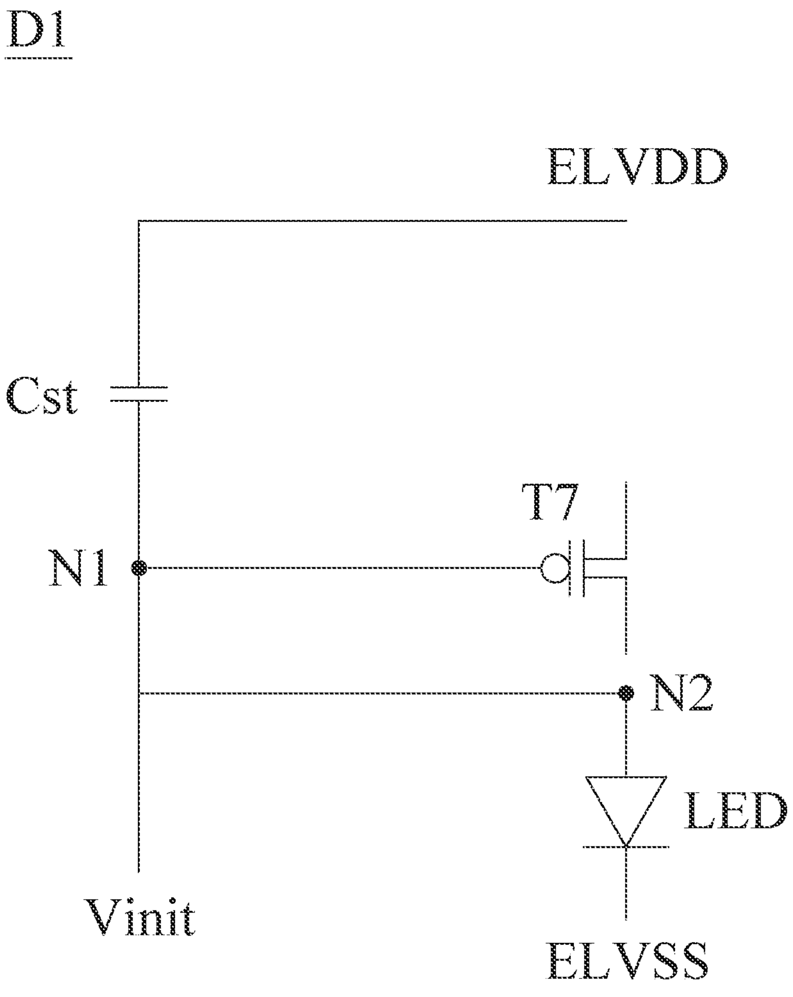
FIG. 9 is an equivalent circuit diagram of the first display phase of the pixel circuit according to the first embodiment of the present invention.
Figure 10:
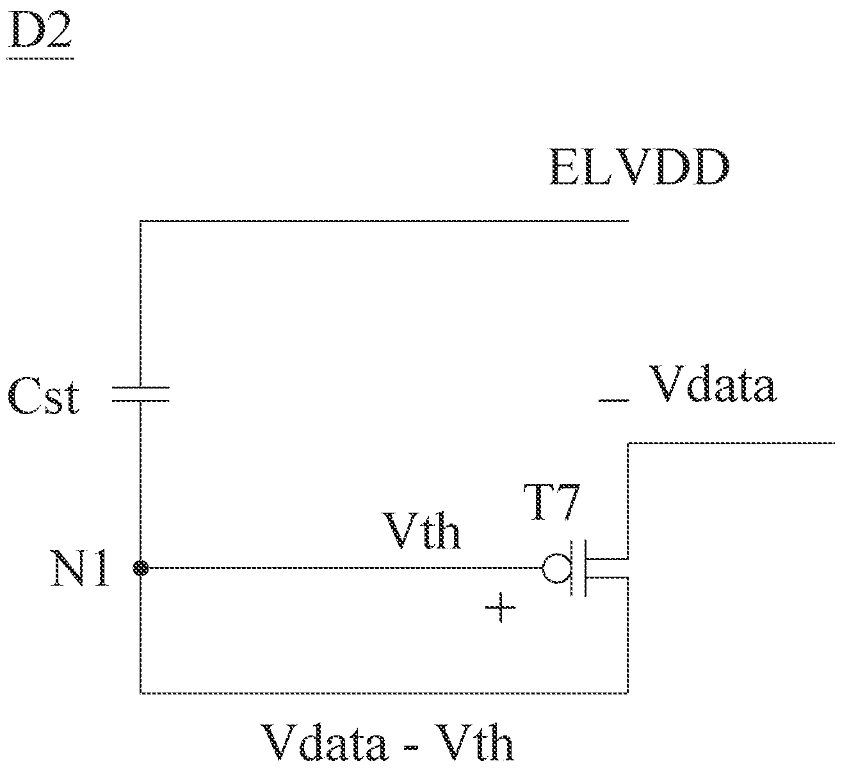
FIG. 10 is an equivalent circuit diagram of the second display phase of the pixel circuit according to the first embodiment of the present invention.
Figure 11:
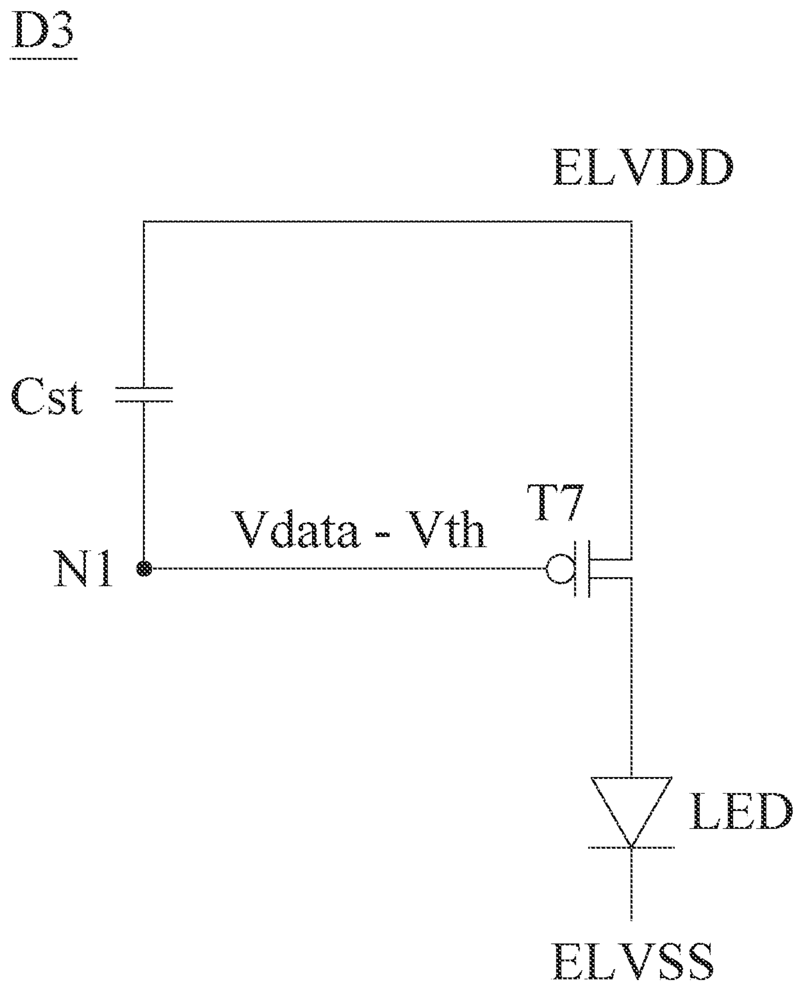
FIG. 11 is an equivalent circuit diagram of the third display phase of the pixel circuit according to the first embodiment of the present invention.

The following describes the circuit operation of the display phase D of the pixel circuit 10 according to the first embodiment of the present invention with reference to FIGS. 3 and 8-11. FIG. 8 is a timing operation diagram illustrating the display phase D of the pixel circuit 10 according to the first embodiment of the present invention; FIG. 9 is an equivalent circuit diagram of the first display phase D1 of the pixel circuit 10 according to the first embodiment of the present invention; FIG. 10 is an equivalent circuit diagram of the second display phase D2 of the pixel circuit 10 according to the first embodiment of the present invention; and FIG. 11 is an equivalent circuit diagram of the third display phase D3 of the pixel circuit 10 according to the first embodiment of the present invention.

Refer to FIG. 8. The display phase D of the present invention includes: the first display phase D1, for initializing the diode LED and the second node N2 with the initialization voltage Vinit; the second display phase D2, for writing the data voltage Vdata into the capacitor Cst; and the third display phase D3, for driving the driving transistor T7 with the voltage stored in the capacitor Cst, so that the driving voltage ELVDD flows to the common voltage ELVSS, to cause the diode LED to emit light. In the display phase D of the present invention, the first gate control signal Sn-1 is the same as the second gate control signal Sn-1_s, the third gate control signal Sn_s is the same as the fourth gate control signal Sn, and the fifth gate control signal EM_s is the same as the sixth gate control signal EM.

Specifically, referring to FIGS. 3, 8, and 9, in the first display phase D1, under the control of the first gate control signal Sn-1, the second gate control signal Sn-1_s, the third gate control signal Sn_s, the fourth gate control signal Sn, the fifth gate control signal EM_s, and the sixth gate control signal EM, the first transistor T1 and the second transistor T2 are on, while the third transistor T3, the fourth transistor T4, the fifth transistor T5, and the sixth transistor T6 are off. Therefore, the diode LED and the second node N2 can be initialized with the initialization voltage Vinit.

Specifically, referring to FIGS. 3, 8, and 10, in the second display phase D2, under the control of the first gate control signal Sn-1, the second gate control signal Sn-1_s , the third gate control signal Sn_s, the fourth gate control signal Sn, the fifth gate control signal EM_s, and the sixth gate control signal EM, the third transistor T3 and the fourth transistor T4 are on, while the first transistor T1, the second transistor T2, the fifth transistor T5, and the sixth transistor T6 are off. Therefore, the data voltage Vdata is stored in the first node N1 through the driving transistor T7, and is written to the capacitor Cst in the form of the data voltage Vdata minus the threshold voltage Vth.

Specifically, referring to FIGS. 3, 8, and 11, in the third display phase D3, under the control of the first gate control signal Sn-1, the second gate control signal Sn-1_s, the third gate control signal Sn_s, the fourth gate control signal Sn, the fifth gate control signal EM_s, and the sixth gate control signal EM, the fifth transistor T5 and the sixth transistor T6 are on, while the first transistor T1, the second transistor T2, the third transistor T3, and the fourth transistor T4 are off. Therefore, in the third display phase D3, the voltage written to the capacitor Cst, i.e., the data voltage Vdata minus the threshold voltage Vth, will be used as the gate voltage of the driving transistor T7, and due to the circuit design, the overdrive of the driving transistor T7 will be (ELVDD-Vdata+Vth) voltage minus the threshold voltage Vth. Therefore, the current flowing through the diode LED will only be controlled by (ELVDD-Vdata) and will not be affected by the individual threshold voltage Vth of the drive transistor T7.

Figure 12:
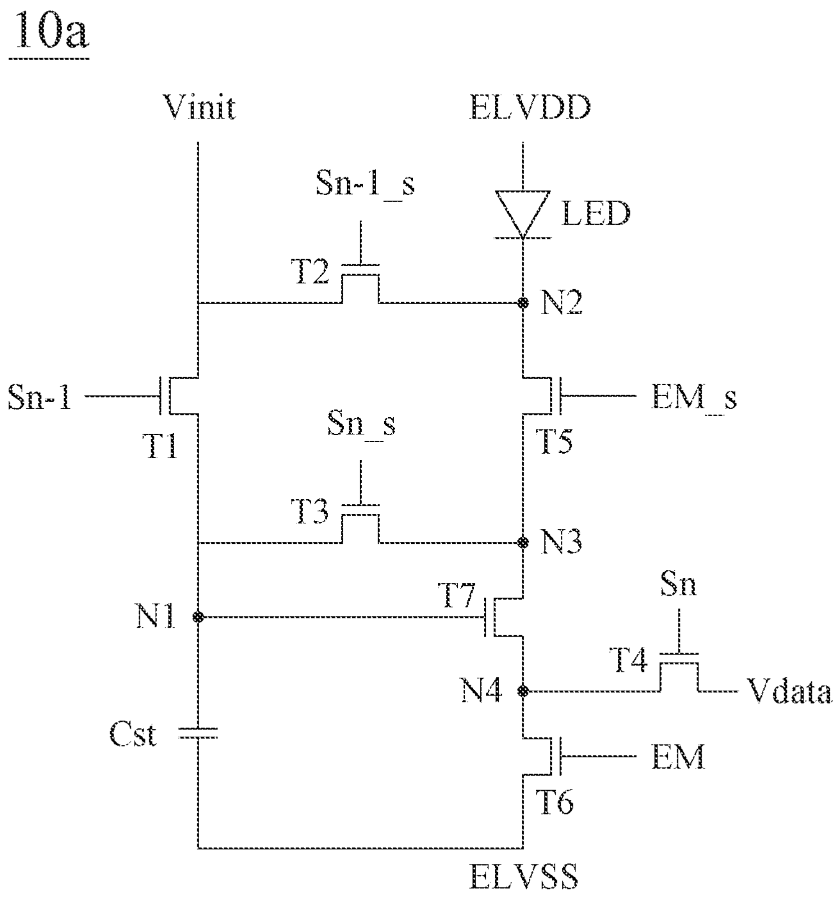
FIG. 12 is a circuit diagram of a pixel circuit according to a second embodiment of the present invention.

Refer to FIG. 12. FIG. 12 is a circuit diagram of a pixel circuit 10*a* according to a second embodiment of the present invention. The difference between the pixel circuit 10*a* and the pixel circuit 10 is that the pixel circuit 10*a* uses NMOS instead of PMOS as the first to sixth transistors T1 to T6 and the driving transistor T7. Other components that are the same as those of the pixel circuit 10 will not be repeated.

Therefore, it can be understood that the first to sixth transistors T1 to T6 and the driving transistor T7 of the pixel circuit 10*a* are also driven in the same manner as the pixel circuit 10. That is, in the first sensing phase S1, the first transistor T1, the second transistor T2, the third transistor T3, and the fifth transistor T5 are on, while the fourth transistor T4 and the sixth transistor T6 are off. In the second sensing phase S2, the third transistor T3 and the fifth transistor T5 are on, while the first transistor T1, the second transistor T2, the fourth transistor T4, and the sixth transistor T6 are off. In the third sensing phase S3, the second transistor T2, the fourth transistor T4, and the fifth transistor T5 are on, while the first transistor T1, the third transistor T3, and the sixth transistor T6 are off. In the first display phase D1, the first transistor T1 and the second transistor T2 are on, while the third transistor T3, the fourth transistor T4, the fifth transistor T5, and the sixth transistor T6 are off. In the second display phase D2, the third transistor T3 and the fourth transistor T4 are on, while the first transistor T1, the second transistor T2, the fifth transistor T5, and the sixth transistor T6 are off. In the third display phase D3, the fifth transistor T5 and the sixth transistor T6 are on, while the first transistor T1, the second transistor T2, the third transistor T3, and the fourth transistor T4 are off.

As such, the pixel circuit 10*a* can also achieve: in the sensing phase S, the diode LED is in a reverse-biasing state to sense light as a photodiode, then the diode LED accumulates charges in an integral mode. to the first node N1, the accumulated charges are stored in the capacitor Cst, and finally, the charge stored in the capacitor Cst is read out. In the display phase D, the diode LED is in forward-biasing state to emit light as a light-emitting diode to display data according to the data voltage Vdata.

Therefore, those skilled in the art can easily understand that the inventive concept of the present invention can be applied to pixel circuits using various types of transistors without being limited by the characteristics of the transistors.

Finally, the technical features of the present invention and its achievable technical effects are summarized as follows:

First, the display device of the present invention can realize both display and sensing functions in the same pixel circuit to have an in-screen sensing function.

Second, since the display device of the present invention uses the same pixel circuit to realize both display and sensing functions at the same time, there is no element between the sensed object and the sensor that will block the light. Therefore, the present invention can achieve more accurate sensing.

Third, since the display device of the present invention uses the same pixel circuit to achieve both display and sensing functions, the total thickness of the screen is thinner, redundant manufacturing processes are not required, and the yield risk caused by additional bonding is reduced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A display device, comprising:

a plurality of sub-pixel areas, each including a pixel circuit, each pixel circuit comprising:

a diode, configured to a forward-biasing state in a display phase of the pixel circuit for light-emitting and configured to a reverse-biasing state in a sensing phase of the pixel circuit for light-sensing;

a driving transistor, for driving the diode in the display phase and serving as a source follower in the sensing phase;

first to sixth transistors, gates of the first to sixth transistors being respectively applied with first to sixth gate control signals, so that the pixel circuit switches between the display phase and the sensing phase; and a capacitor, for storing a data voltage to be written to the diode in the display phase and storing charges accumulated by the diode in the sensing phase;

wherein the diode is a light emitting diode for emitting light in the display phase and the diode is a photodiode for sensing light in the sensing phase;

a first circuit, for applying the six gate control signals to each pixel circuit to switch each pixel circuit between the display phase and the sensing phase respectively; and a second circuit, for applying an initialization voltage, the data voltage, a driving voltage, and a common voltage, and the second circuit comprising a readout part for reading out the light sensed by the diode during the sensing phase of the pixel circuit;

wherein the sensing phase further comprising:

a first sensing phase in which the first to sixth gate control signals control the first to sixth transistors so that the first transistor, the second transistor, the third transistor, and the fifth transistor are on, and the fourth transistor and the sixth transistor are off for initializing the diode so that the diode is in the reverse-biasing state;

a second sensing phase in which the first to sixth gate control signals controls the first to sixth transistors so that the third transistor and the fifth transistor are on, and the first transistor, the second transistor, the fourth transistor, and the sixth transistor are off for storing the charges accumulated in the diode into the capacitor; and a third sensing phase in which the first to sixth gate control signals control the first to sixth transistors so that the second transistor, the fourth transistor, and the fifth transistor are on, and the first transistor, the third transistor, and the sixth transistor are off for using the driving transistor as the source follower to read out the charges stored in the capacitor.

2. The display device according to claim 1, wherein in the display phase, the first gate control signal is the same as the second gate control signal, the third gate control signal is the same as the fourth gate control signal, and the fifth gate control signal is the same as the sixth gate control signal.

3. The display device according to claim 1, wherein in each pixel circuit, a first electrode of the first transistor is connected to a first node, a second electrode of the first transistor is applied with the initialization voltage, a first electrode of the second transistor is applied with the initialization voltage, a second electrode of the second transistor is connected to a second node, a first electrode of the third transistor is connected to the first node, a second electrode of the third transistor is connected to a third node, a first electrode of the fourth transistor is applied with the data voltage, a second electrode of the fourth transistor is connected to a fourth node, a first electrode of the fifth transistor is connected to the third node, a second electrode of the fifth transistor is connected to the second node, a first electrode of the sixth transistor is connected to the driving voltage, a second electrode of the sixth transistor is connected to the fourth node, a gate of the driving transistor is connected to the first node, a first electrode of the driving transistor is connected to the fourth node, a second electrode of the driving transistor is connected to the third node, a first electrode of the diode is connected to the second node, and a second electrode of the diode is applied with the common voltage.

4. The display device according to claim 1, wherein the readout part comprises a plurality of readout circuits, so that a plurality of pixel circuits in each column have respective corresponding readout circuits, and each readout circuit comprises a current source for reading out the light sensed by the diodes in the pixel circuits in the sensing phase of the pixel circuits.

5. The display device according to claim 4, wherein in the third sensing phase, the charges stored in the capacitor are input to the gate of the driving transistor using the first node as an input voltage, and the light sensed by the diode as a photodiode is read out as an output voltage located at the readout circuit.

6. The display device according to claim 1, wherein the diode comprises one of a micro light-emitting diode, a sub-millimeter light-emitting diode, and an organic light-emitting diode.

7. The display device according to claim 1, wherein the transistors include one of or any combination of P-type metal oxide semiconductor field effect transistors (MOSFET), N-type MOSFETs, thin film transistors (TFT), low-temperature polycrystalline silicon TFTs, and low-temperature polycrystalline oxide TFTs.

* * * * *